Figure 1:
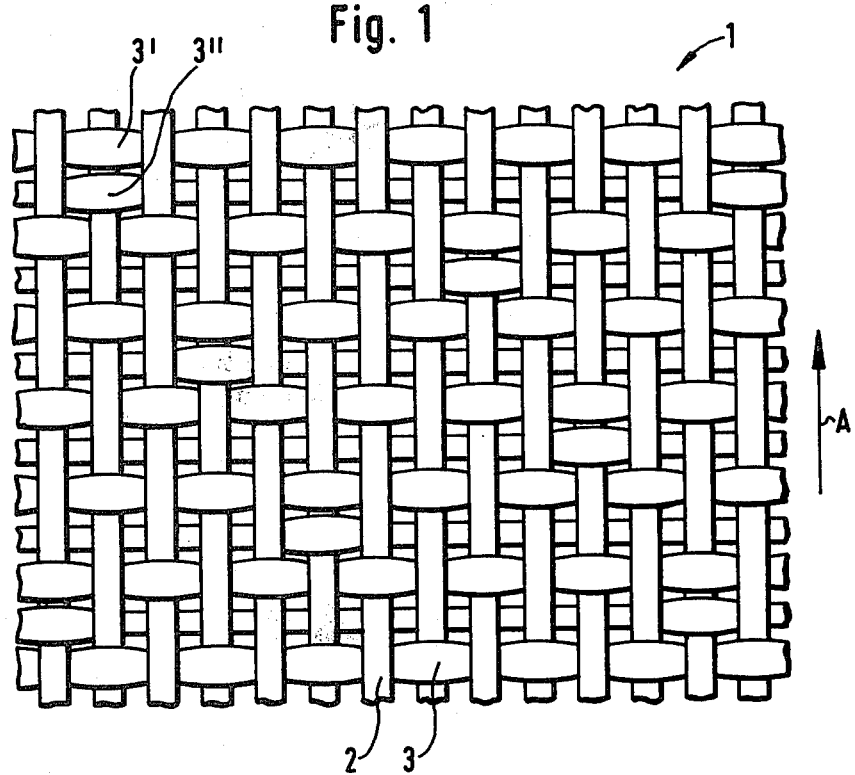

United States Patent [19]

Vuorio

[11] Patent Number: 4,470,434
[45] Date of Patent: Sep. 11, 1984

[54] SINGLE-PLY WIRE FOR PAPER MACHINES

[75] Inventor: Tauno A. Vuorio, Olten, Switzerland

[73] Assignee: Siebtuchfabrik AG, Olten, Switzerland

[21] Appl. No.: 441,621

[22] Filed: Nov. 15, 1982

[30] Foreign Application Priority Data

Nov. 15, 1981 [CH] Switzerland ................ 7331/82

[51] Int. Cl.³ ............ D03D 15/00; D21F 1/10; B01D 39/10
[52] U.S. Cl. .............. 139/425 A; 139/383 A; 162/DIG. 1; 428/257
[58] Field of Search ............ 139/425 A, 383 A; 162/DIG. 1, 348, 349; 210/499, 507; 428/255, 257

[56] References Cited

U.S. PATENT DOCUMENTS

| | | | |
|---|---|---|---|
| 2,903,021 | 9/1959 | Holden et al. | 139/383 A |
| 4,157,276 | 6/1979 | Wandel et al. | 139/425 A |
| 4,239,065 | 12/1980 | Trokhan | 139/383 A |
| 4,376,455 | 3/1983 | Hahn | 139/383 A |

FOREIGN PATENT DOCUMENTS 94069  9/1897  Fed. Rep. of Germany ... 139/425 A

OTHER PUBLICATIONS

*Advance Textile Design*, by William Watson, Longmans, Green, and Co., London, 1925, pp. 9–12.

Primary Examiner—James Kee Chi
Attorney, Agent, or Firm—Shlesinger, Arkwright, Garvey & Fado

[57] ABSTRACT

A single-ply paper machine wire having a top side and a bottom side and including longitudinal machine direction threads and cross-threads, comprising a first group of cross-threads having at least one pattern repeat comprising differential lacing interwoven with a maximum of five longitudinal threads for forming said top side of said wire; a second group of cross-threads, each thread of said second group of cross-threads disposed between a pair of threads of said first group of cross-threads; said second group of cross-threads having at least one pattern repeat interwoven with at least six longitudinal threads; said second group of cross-threads pattern repeat floating under at least five of said longitudinal threads on said bottom side; and, said longitudinal and said cross-threads being synthetic is disclosed.

16 Claims, 7 Drawing Figures

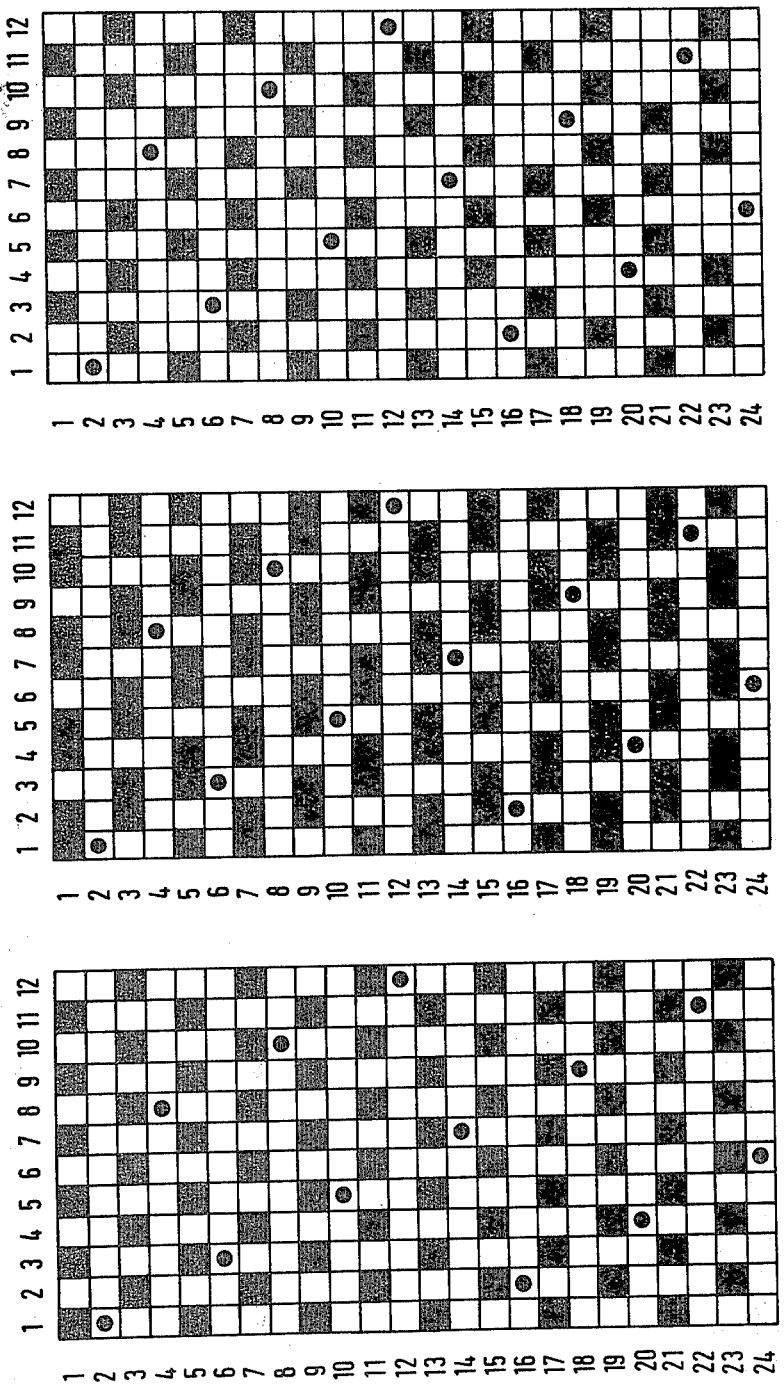

SINGLE-PLY WIRE FOR PAPER MACHINES

The invention concerns a single-ply wire for paper machines woven from synthetic longitudinal and cross threads, where the cross threads within each pattern repeat will cross at least one longitudinal thread at the top side of the paper-machine wire at least once, and once at its bottom side.

Single-ply wires for paper machines are woven from longitudinal threads running in the direction of advance of the paper machine and of cross-threads transverse thereto. Ordinarily and based on the weaving process, the longitudinal threads also are the warp threads and the cross-threads are the fillings.

As a rule the longitudinal threads are so woven with the cross-threads that the pattern repeats recur at specific spacings, that is, the pattern repeat of the longitudinal threads recurs after a given number of cross-threads and the pattern repeat of the cross-threads recurs after a given number of longitudinal threads. This is denoted as a pattern repeat of the longitudinal threads and a pattern repeat of the cross-threads.

Illustratively, a cross-thread within one pattern repeat first passes on one side of the wire of the paper machine, then passes through this side to extend along the other side of the paper-machine wire. This cross-thread may pass on one side or on both sequentially over several longgitudinal threads before changing sides. In this case not only one, but a corresponding number of longitudinal threads are laced together. The sum of longitudinal threads crossed on both sides of a paper-machine wire within a pattern repeat determines the length of the pattern repeat of the cross-threads.

The side of a paper-machine wire where the sheet of paper is formed is termed the top side and the side where the wire moves over the rolls and suction equipment is called the bottom side.

Most wires for paper machines are woven with relatively small pattern repeats both for the longitudinal and the cross threads. As a rule they only extend over five threads. The advantages of these very narrow repeats are that only very small wire marks are formed in the sheet of paper, that the sheet can be very easily removed and only few fibers penetrate the wire, so that fiber retention is good.

These wires for paper-machines however do suffer from the drawback they evince only a relatively low resistance to abrasion because the cross threads especially are bent rather markedly due to their frequent alternation of sides, whereby the wire rests only on these bends. Accordingly they wear very rapidly. Moroever the internal volume of the paper-machine wire is relatively small, hampering dehydration.

It is therefore the object of the invention to create a wire for paper machines which on one hand causes only slight markings, namely which is suited for the manufacture of high-grade papers and evinces good fiber retention, and which also is characterized on the other hand by high wear-resistance and good dehydration properties.

This problem is solved by the invention in that a first group of cross threads evinces one or more pattern repeats extending as a whole over a maximum of five longitudinal threads and in that a second group of cross threads evinces one or more pattern repeats extending on the whole over at least one more longitudinal thread than the pattern repeat(s) of the first group of cross-threads, the cross threads of the second group crossing the majority of the longitudinal threads of one pattern repeat at the bottom side of said longitudinal threads.

The paper-machine wire of the invention therefore comprises two groups of cross threads, one group evincing one or more relatively short pattern repeats and the other group one or more comparatively long pattern repeats, in the latter case the cross threads being longer on the bottom side than on the top side of the paper-machine wire. In this manner the paper-machine wire retains a relatively large number of cross-thread bends at the top side, whereby few marks and good fiber retention are achieved. On the other hand the wire moves over rolls, suction boxes and the like by means of the stretched bends of the second group of cross threads, whereby substantially improved wear properties are obtained. The wire therefore is suited for the manufacture of high-grade papers and nevertheless has a relatively long life. In addition, due to the scraping effect from the stretched bends, accumulations of paper fibers on the suction boxes, wire guidance members and the like are prevented and the water drainage is improved. On the whole the paper-machine wire of the invention evinces properties which in the heretofore known wires could not be combined.

To implement the invention, the cross threads of the second group shall have one or more pattern repeats extending as a total over at least six longitudinal threads and these cross threads preferably will cross only one longitudinal thread at its upper side within one pattern repeat. Accordingly the predominant number of longitudinal threads will be crossed by this group of cross threads at the bottom side so that the largest possible contact area shall be created when the paper-machine wire rests on guidance means and the like. At least this group of cross threads shall sequentially cross five longitudinal threads on the bottom side.

As regards forming sheets especially low in markings, it is recommended that the cross threads of the first group have a repeat pattern extending only over two longitudinal threads as in this case an especially large number of cross-thread bends will be present at the top side. On the other hand the cross-threads of the second group should have a pattern repeat extending over a total of eight to twelve longitudinal threads.

A further feature of the invention provides that where a cross thread of the second group crosses a longitudinal thread at the top side, at least one adjacent cross thread from the first group, which because of the pattern repeat also should cross at this longitudinal thread at the top side, is made to pass underneath this longitudinal thread. It is prevented in this manner that the same longitudinal thread shall be laced at its top side by two adjacent cross threads, whereby undesired markings would be incurred.

To achieve a uniform surface, the invention provides that as seen in the direction of the longitudinal threads, a given number of cross threads of the first group alternate with a given number of cross threads of the second group. Preferably in this case at most two cross threads of the first group shall alternate with at most two cross threads of the second group, so as to achieve high uniformity.

Because the cross threads of the second group are alone subjected to abrasion in view of the weaving of the invention, it is recommended they be endowed with a larger cross-section than those of the first group, because the life of the wire for the paper machine is extended in this manner.

The invention further provides that the cross threads of the second group—if it is imagined to overlook the remaining cross threads—form with the longitudinal threads a twill or Atlas weave, where every second cross thread of this group is offset at the top side of longitudinal threads in the direction of the cross threads with respect to the lacing sites resulting per se from the twill or Atlas weave. This modification of a twill or Atlas weave results in a more uniform distribution of the crossing sites at the top side of the longitudinal threads of the cross threads of the second group, especially for a long pattern repeat.

A further feature of the invention provides that the free internal volume of the paper-machine wire be at least 50% of the volume of the wire body, whereby an improved dehydration performance is achieved.

When abstracting by imagination the remaining cross threads, the first group of cross threads also can form a plain weave with the longitudinal threads. A twill or Atlas weave also is possible. Moreover a combination of both weaves may be appropriate, wherein every second cross thread from the first group of cross threads is woven into a plain weave and the cross threads in-between from this groups are woven into twill or Atlas weaves—each time imagining all the remaining cross threads omitted—with the longitudinal threads.

Lastly the invention also provides that the cross threads from the second group be made of a synthetic of which the shrinkage during thermo-setting is so much larger than for the synthetic of the cross threads of the first group that the cross threads of the second group will lie flat under tension against the bottom side of the paper-machine wire. If for instance the cross threads of both groups were made identical, then there would be a higher transverse contraction in the cross threads of the first group than for those of the second group. In that case the cross threads of the second group no longer would lie flat against the bottom side, instead they would slightly sag. This is a drawback as regards the wear properties.

The drawing shows the invention in relation to illustrative embodiments and in closer detail.

Figure 2:
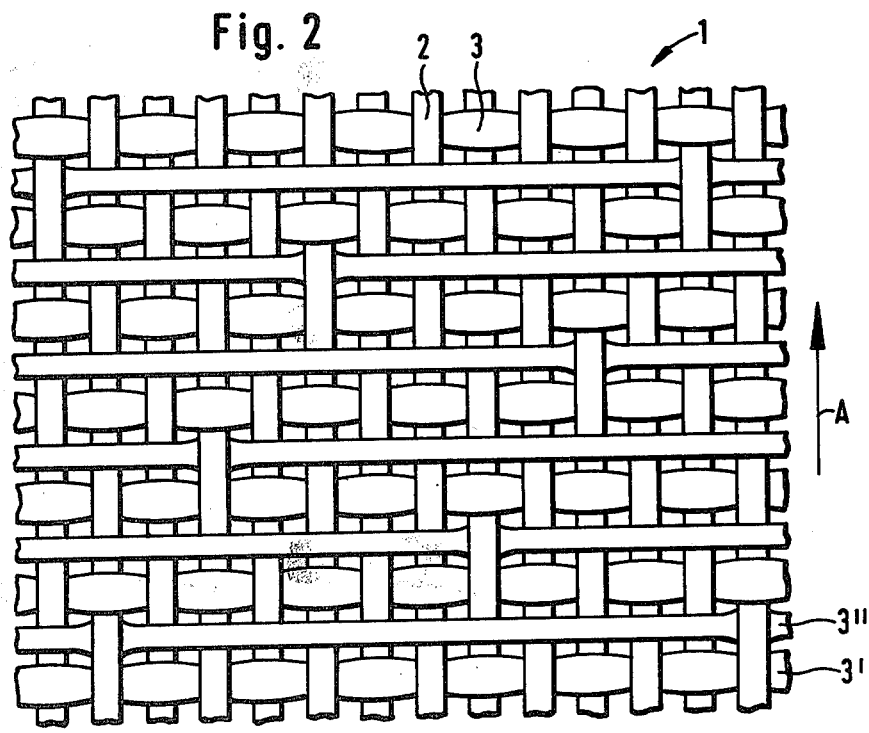
Figure 3:
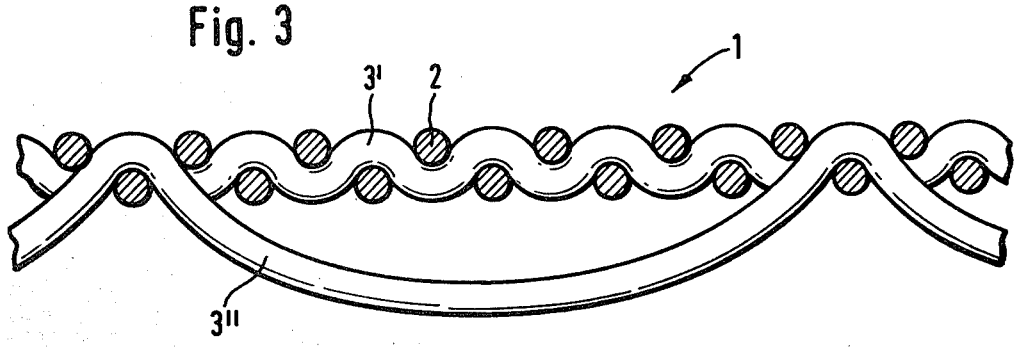
Figure 4:
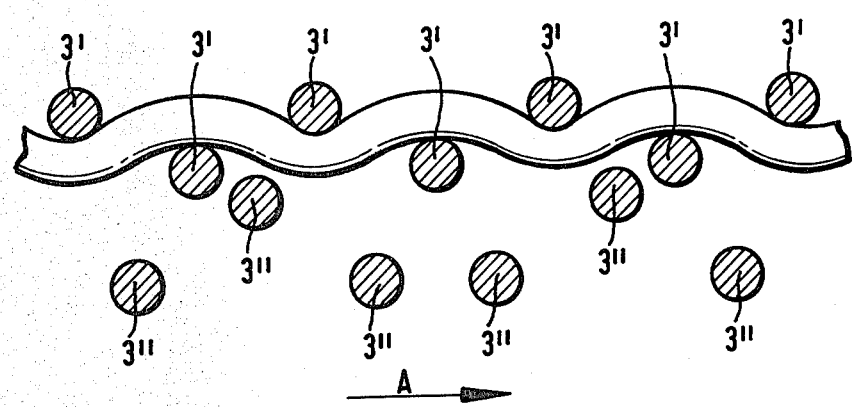

FIG. 1 is a cut-out topview of the top side of a wire for a paper-machine,

FIG. 2 is a cut-out topview of the bottom side of the paper-machine wire of FIG. 1 which was flipped about a horizontal axis, FIG. 3 is a cut-out cross-section of the paper-machine wire of FIGS. 1 and 2, FIG. 4 is a cut-out longitudinal sectin of the paper-machine wire of FIGS. 1 through 3, FIG. 5 is the paper-machine wire of FIGS. 1 through 4 shown in pattern form, FIGS. 6 and 7 are further embodiments of paper-machine wires shown in pattern form.

The FIGS. 1 through 4 show a paper-machine wire 1 woven from longitudinal threads 2 and cross threads 3. The arrows A always indicate the direction of advance of the paper-machine wire 1 and hence also the direction of the longitudinal threads 2.

As shown in particular by FIGS. 1 and 2, the longitudinal threads 2 are woven in two ways with the cross threads 3. In one of the weave types the pattern repeat of the cross threads 3' in each instance extends only across two longitudinal threads 2, that is the cross threads 3' only cross one longitudinal thread 2 before passing through the paper-machine wire 1 to the other side where they cross a further longitudinal thread 2. In this manner a plurality of short bends are generated at the top side, which favor sheet formation low in markings, retention and sheet removal.

The cross threads 3' alternate with further cross threads 3" of which the pattern repeat extends over twelve longitudinal threads 2, the cross threads 3" first crossing one longitudinal thread 2 at the top side and, after changing wire sides, consecutively eleven longitudinal threads 2 at the bottom side.

FIG. 3 shows even more clearly the differential lacing of the cross threads 3' of short pattern repeat and the cross threads 3" of long pattern repeat. It can be noted that the first-cited cross threads 3' together with the longitudinal threads 2 essentially form the surface, namely the sheetforming side of the paper-machine wire 1, whereas the other cross threads 3" form elongated lengthwise stretched rise areas at the bottom side, whereby good abrasion resistance is provided.

This circumstance also is shown in FIG.4, which also clearly indicates that the cross threads 3" of long pattern repeat practically form the lower boundary of the paper-machine wire 1, whereby the remaining cross threads 3' and especially also the longitudinal threads 2, which must absorb the tension forces, are preserved from wear.

FIGS. 5 through 7 show embodiments of paper-machine wires in the form of patterns conventional in pattern representations with numbers arranged at the top and on the side that denote the longitudinal and cross rows. Each horizontal row of boxes represents one cross thread and each vertical row of boxes represents one longitudinal thread. Accordingly each particular box forms a crossing point between a longitudinal and a cross thread. Where the box is copletely blackened, or provided with a dot, the particular longitudinal thread will pass over the cross thread being crossed there. If the box is entirely blank, the longitudinal thread crosses the cross thread there at the bottom side of wire of the paper machine.

FIG. 5 represents the paper-machine wire 1 of FIGS. 1 through 4 and immediately shows that the longitudinal threads 2 with the odd numbers 3' have a pattern repeat extending only across two longitudinal threads 2 and hence form a plain weave, as indicated by the black and white boxes. On the other hand the even cross threads 3" are woven together with the longitudinal threads 2 into a twill, as indicated by the black dots. This is of course the fact only precisely so when the particular other group of cross threads 3' and 3" is imagined omitted.

The even-numbered cross threads 3" have a pattern repeat extending across twelve longitudinal threads, the cross threads 3" within a given pattern repeat crossing only one longitudinal thread at the top side, the remaining ones on the bottom side. The cross threads 3" are so mutually offset with respect to their crossing sites at the top side of the longitudinal threads 2 that they form diagonal arrays extending from the top left to the bottom right. The spacing between the diagonals in the direction of the cross threads amounts to four longitudinal threads 2, while the spacing between two crossin points in a diagonal in the direction of the cross thread is one longitudinal thread 2. If the odd-numbered cross threads 3' are imagined omitted, it is also possible to consider this pattern a modified twill weave, the modification being that every second cross thread 3' is offset to the right from the crossing site due to the twill at the top side of the longitudinal thread 2 in an amount of five longitudinal threads.

As regards the embodiment shown in FIG. 6, the first group of cross threads, namely the odd-numbered ones, has a pattern repeat extending across three longitudinal threads, two of these longitudinal threads crossing at the top side. The even-numbered cross threads always form pattern repeats extending across twelve longitudinal threads, eleven of these being crossed at the bottom side of the wire. Either group of cross threads together with the longitudinal threads forms twill weaves provided abstraction is made of the other group. The lacing of the cross threads of the second group is identical with the corresponding cross threads of FIG. 5, especially as regards the offset of the particular second cross threads of this group.

FIG. 7 shows the pattern draft of a paper-machine wire which for a single difference corresponds to that of FIG. 5. This difference is that the plain weave of the even-numbered cross threads, that is, those from the first group, is not fully formed. Contrary to the typical pattern, these cross threads there are not made to pass over a longitudinal thread, the particular adjacent even-numbered cross thread passing over this longitudinal thread. The lastcited cross thread then practically complements the plain weave at this site. Two adjacent cross threads are prevented in this manner from passing over the same longitudinal thread, as undesired markings might be incurred otherwise.

Otherwise the weave is precisely the same as shown in FIG. 5, and accordingly the description relating thereto can be used as reference.

Obviously other types of weaves also can be used to implement the basic conception of the invention. Illustratively there is the possibility to follow-up after only two cross threads from the first group with a cross thread of the second group. This sequence is also feasible in the reverse order.

I claim:

1. A single-ply paper-machine wire having a top side and a bottom side and including longitudinal machine direction threads and cross threads, comprising:
   (a) a first group of cross threads having at least one pattern repeat comprising differential lacing interwoven with a maximum of five longitudinal threads for forming said top side of said wire;
   (b) a second group of cross threads, each thread of said second group of cross threads disposed between a pair of threads of said first group of cross threads;
   (c) said second group of cross threads having at least one pattern repeat interwoven with at least six longitudinal threads;
   (d) said second group of cross threads pattern repeat floating under at least five of said longitudinal threads on said bottom side; and,
   (e) said longitudinal and said cross threads being synthetic.

2. A paper machine wire as defined in claim 1, wherein:
   (a) said cross threads of said second group have a pattern repeat extending over a total of 12 longitudinal threads.

3. Paper-machine wire per claim 1, characterized in that the cross threads of the second group only cross one longitudinal thread at its top side within one pattern repeat.

4. Paper-machine wire per claim 1, characterized in that the cross threads of the second group consecutively cross at least five longitudinal threads at the bottom side within one pattern repeat.

5. Paper-machine wire per claim 1, characterized in that the cross threads of the first group have a pattern repeat extending only over a total of two longitudinal threads.

6. Paper-machine wire per claim 1, characterized in that the cross threads of the second group have a pattern repeat extending over a total of at least eight longitudinal threads.

7. Paper-machine wire per claim 1, characterized in that at those sites where a cross thread of the second group crosses a longitudinal thread at the top side, at least one adjacent cross thread from the first group which in accordance with the pattern repeat should per se also cross this longitudinal thread at the top side is made to pass underneath this longitudinal thread.

8. Paper-machine wire per claim 1, characterized in that, when seen in the direction of the longitudinal thread, a given number of cross threads from the first group alternate with a given number of cross threads from the second group.

9. Paper-machine wire per claim 8, characterized in that as seen in the direction of the longitudinal threads, at most two cross threads from the first group alternate with at most two cross threads from the second group.

10. Paper-machine wire per claim 1, characterized in that the cross threads from the second group evince a larger cross-section than those from the first group.

11. Paper-machine wire per claim 1, characterized in that the cross threads from the second group form together with the longitudinal threads a twill or Atlas weave when abstraction is made of the remaining cross threads every second cross thread of this group being offsettable in the direction of the cross threads at the top side of the longitudinal threads with respect to the crossing sites resulting from the twill or Atlas weave.

12. Paper-machine wire per claim 1, characterized in that the free internal volume of the paper-machine wire amounts to at least 50% of the wire-body volume.

13. Paper-machine wire per claim 1, characterized in that the first group of the cross threads together with the longitudinal threads form a plain weave when abstraction is made of the remaining cross threads.

14. Paper-machine wire per claim 1, characterized in that the first group of the cross threads forms together with the longitudinal threads a twill or Atlas weave when abstraction is made of the remaining cross threads.

15. Paper-machine wire per claim 1, characterized in that every second cross thread from the first group of cross threads is woven together with the longitudinal threads into a plain weave and in that the in-between cross threads from this group are woven together with the longitudinal threads into twill or Atlas weaves, when abstraction is made of all remaining cross threads.

16. Paper-machine wire per claim 1, characterized in that the cross threads from the second group are made of a synthetic of which the shrinkage during thermosetting is so much more pronounced than that of the synthetic of the cross threads from the first group that the cross threads from the second group following the thermosetting step will lie flat and under tension against the bottom side of the paper-machine wire.

* * * * *